March 24, 1931.  B. F. SCHMIDT  1,797,798
GEAR SHIFT MECHANISM
Filed April 3, 1928
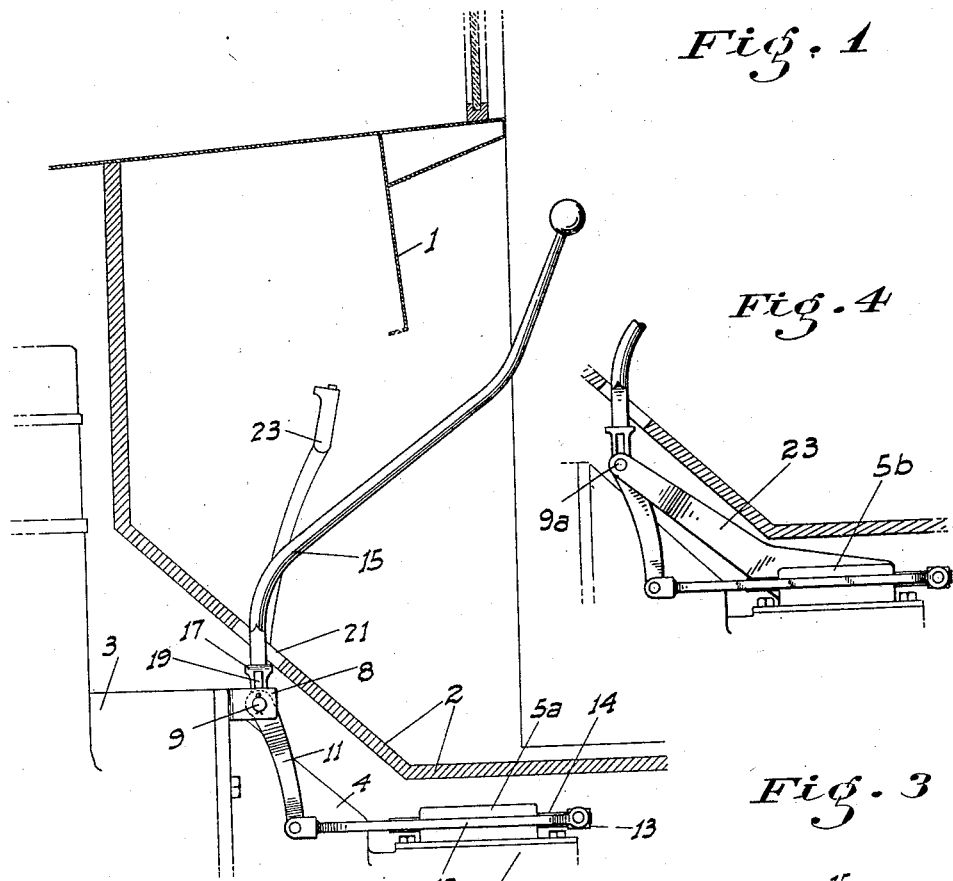
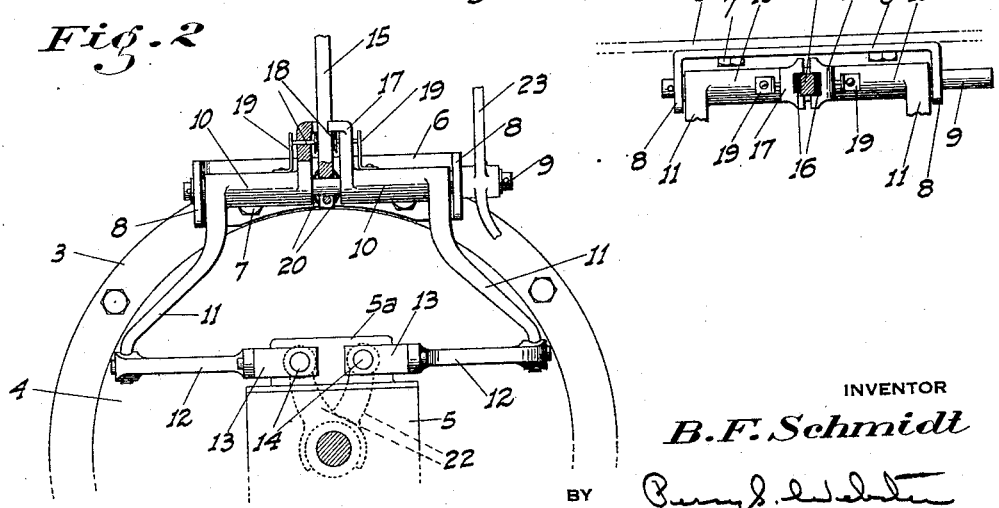
INVENTOR
B. F. Schmidt
BY
ATTORNEY Patented Mar. 24, 1931

1,797,798

UNITED STATES PATENT OFFICE

BENJAMIN F. SCHMIDT, OF LOS ANGELES, CALIFORNIA, ASSIGNOR TO SCHMIDT PRODUCTS, INCORPORATED, OF DETROIT, MICHIGAN

GEAR-SHIFT MECHANISM

Application filed April 3, 1928. Serial No. 266,912.

This invention relates to gear shift mechanisms for motor vehicles, my principal object being to provide an improved and simplified arrangement of the type of structure shown in my co-pending application for patent, Serial No. 209,242, filed July 29, 1927; and one in which nothing but the shift lever itself projects upwardly through or is visible from above the floor of the car.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved gear shift mechanism as installed in a motor vehicle.

Fig. 2 is a rear end view of the mechanism partly broken out.

Fig. 3 is a fragmentary top plan view showing the lever and rocking arm mounting.

Fig. 4 is a fragmentary side elevation showing a modified form of lever and arm supporting means.

Referring now more particularly to the characters of reference on the drawings, the numeral 1 denotes the dashboard and 2 the floor of the driver's compartment of an automobile. 3 is the flywheel housing of the power plant of the car, 4 the clutch throw-out housing, and 5 is the transmission housing, all of which are arranged as usual under the floor.

My improved shift mechanism structure is associated with these parts and comprises a bracket plate 6 to abut against the rear face of the fly wheel housing and to be rigidly secured thereto by certain of the standard cap bolts 7 thereof. At the ends the plate is formed with rearwardly extending ears 8 which support a transverse shaft 9.

Turnable on this shaft between the ears independently of each other are sleeves 10, from which arms 11 rigidly depend, these arms being bent outward toward the lower ends to avoid contact with the flaring sides of the housing 4.

At their lower ends these arms are pivoted to rigid links 12 which extend thence alongside the cap 5a of the transmission housing to pivotal connections at their rear ends with rigid blocks 13 which are secured to the rear ends of the shifter rods 14 of the transmission mechanism which project from the rear end of the cap 5a.

The adjacent ends of the sleeves 10 are separated from each other, to leave a space on the shaft for the mounting of the lower end of the shift lever 15 thereon. This lever is arranged to both turn longitudinally on the shaft and to rock laterally thereon, and a short distance above the shaft passes through and is adapted to selectively engage longitudinally extending and oppositely disposed selector slots 16 which are formed in extensions 17 projecting upwardly from the adjacent ends of the sleeves 10.

Transversely slidable pins 18 mounted in the extensions bear against the opposite faces of the lever and are pressed into yielding engagement therewith by springs 19. This prevents possible rattling of the lever without interfering with its lateral rocking movement. Washers 20 which are concaved relative to the lever are disposed about the shaft between the lever and the adjacent ends of the sleeves, and prevent lateral movement of the lever along the shaft without interfering with its rocking or turning movement.

The extensions 17 are disposed entirely below the floor and the lever thereabove projects upwardly through a slot 21 in the floor and is then bent to extend rearwardly and upwardly to a termination a convenient distance rearwardly of the dash board.

The rocking of the lever to the left causes the same to engage the left hand selector, and the shifting of the lever shifts the corresponding link and shifter rod, instead of the reverse as is the case with the ordinary transmission. The respective rods are therefore connected by their forks 22 with those gears of the transmission which enables the same gears to be shifted with a movement of the lever in the same direction as is had with a standard transmission structure. The operator of my improved mechanism can therefore follow standard practice and movements when making gear shifts. The usual interlocking spring and ball latch to prevent undesired movement of the shifter rods is provided between said rods as is customary, and consequently it has not been thought necessary to illustrate such interlocking.

The shaft 9 preferably extends somewhat beyond one of the gears 8, to enable the emergency brake lever 23 to be mounted thereon, thus making a compact shift and brake lever arrangement.

In the arrangement shown in Fig. 4, the construction and operation are essentially the same as above described. The lever and sleeve supporting shaft 9a in this type, however, is mounted in spaced bracket arms 23 which is not connected to the flywheel housing but is formed as an extension of the transmission cover 5b. This enables the transmission and gear shift mechanism to be mounted together as a unit, making for easier assembly and lining up of parts.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A gear shift mechanism for a motor vehicle including a transverse shaft, a bracket supporting the shaft and projecting upwardly and forwardly from a rigid connection with the transmission cover; a shift lever turnably mounted on the shaft, members on the shaft adapted to be selectively engaged and moved by the turning of the lever, and exterior connections between said members and the gear shift rods of the transmission mechanism.

2. A gear shift mechanism for a motor vehicle including a bracket rigid with and extending upwardly and forwardly from the cover of the transmission mechanism, a transverse shaft supported by the bracket at its forward end, members supported by and depending from the shaft, connections between said members and the gear shifter rods of the transmission mechanism, and a lever projecting upwardly from the shaft for selectively rocking said members in either direction.

3. A gear shift mechanism for a motor vehicle including an exposed transverse shaft, means for supporting the shaft in fixed relation to and ahead of the transmission mechanism of the vehicle but rearwardly of the flywheel housing thereof, transversely spaced arms depending from the shaft to a level substantially that of the shifter rods of the transmission, said arms diverging from each other toward their lower ends whereby to place such lower ends to the sides of the transmission housing and clear of the fly-wheel housing while permitting the use of a relatively short shaft, connections between the lower ends of the arms and said shifter rods at their rear ends, and lever means for selectively rocking said arms in either direction.

In testimony whereof I affix my signature.

BENJAMIN F. SCHMIDT.